(12) United States Patent
Urazghildiiev

(10) Patent No.: US 10,222,493 B2
(45) Date of Patent: Mar. 5, 2019

(54) SYSTEM AND METHODS FOR PROCESSING AND THE VISUALIZATION OF BIOACOUSTICAL INFORMATION

(71) Applicant: Cornell University, Ithaca, NY (US)

(72) Inventor: Ildar Urazghildiiev, Ithaca, NY (US)

(73) Assignee: Cornell University, Ithaca, NY (US)

( * ) Notice: Subject to any disclaimer, the term of this patent is extended or adjusted under 35 U.S.C. 154(b) by 305 days.

(21) Appl. No.: 15/029,758

(22) PCT Filed: Oct. 23, 2014

(86) PCT No.: PCT/US2014/062037
§ 371 (c)(1),
(2) Date: Apr. 15, 2016

(87) PCT Pub. No.: WO2015/061609
PCT Pub. Date: Apr. 30, 2015

(65) Prior Publication Data
US 2016/0252635 A1    Sep. 1, 2016

Related U.S. Application Data

(60) Provisional application No. 61/894,504, filed on Oct. 23, 2013.

(51) Int. Cl.
*G01V 1/00* (2006.01)
*G01V 1/38* (2006.01)

(52) U.S. Cl.
CPC ............... *G01V 1/001* (2013.01); *G01V 1/38* (2013.01)

(58) Field of Classification Search
CPC ........................................ G01V 1/001
USPC ............................................. 702/2
See application file for complete search history.

(56) References Cited

U.S. PATENT DOCUMENTS

| 5,956,463 | A | * | 9/1999 | Patrick | ................. G10L 15/16 |
| | | | | | 119/906 |
| 6,477,472 | B2 | | 11/2002 | Qain | |
| 7,551,519 | B2 | | 6/2009 | Slater | |
| 8,195,409 | B2 | | 6/2012 | Bruno | |

FOREIGN PATENT DOCUMENTS

| EP | 0629996 | | 12/1994 |
| EP | 0629996 | A2 * | 12/1994 |
| WO | 2013052549 | | 4/2013 |

* cited by examiner

*Primary Examiner* — Anthony Ho
(74) *Attorney, Agent, or Firm* — Valauskas Corder LLC

(57) ABSTRACT

The present invention is directed to acoustics and signal processing. More specifically, the present invention is directed to a system and methods by which whether and the time during which one or more subjects are present within a given area of a marine or terrestrial ecosystem, and other information regarding the subjects can be efficiently determined by the sounds that the subjects produce. Advantageously, certain embodiments of the present invention permit a user to select and rapidly produce one or more visual presentations of the signals of interest (SOI) recorded from the passive acoustic monitoring of a given area of an ecosystem in order to obtain additional information about the subjects.

10 Claims, 13 Drawing Sheets

SYSTEM AND METHODS FOR PROCESSING AND THE VISUALIZATION OF BIOACCOUSTICAL INFORMATION

CROSS-REFERENCE TO RELATED APPLICATIONS

This application claims the benefit of U.S. Provisional Patent Application No. 61/894,504 filed Oct. 23, 2013, which is incorporated by reference.

STATEMENT REGARDING FEDERALLY SPONSORED RESEARCH

This invention was made with government support under DBI-1003220 awarded by the National Science Foundation (NSF). The government has certain rights in the invention.

FIELD OF THE INVENTION

The present invention is directed to acoustics and signal processing. More specifically, the present invention is directed to a system and methods by which whether and the time during which one or more subjects are present within a given area of a marine or terrestrial ecosystem, and other information regarding the subjects can be efficiently determined by the sounds that the subjects produce.

Advantageously, certain embodiments of the present invention permit a user to select and rapidly produce one or more visual presentations of the signals of interest (SOI) recorded from the passive acoustic monitoring of a given area of an ecosystem in order to obtain additional information about the subjects.

BACKGROUND OF THE INVENTION

In many contexts, it is advantageous to know whether and which animals have been or are present in a certain location, their density, and the length of time they have stayed in and/or likely remain within the given location. One context in which it is important to have this information is marine shipping. It is advantageous for marine vessels to know, for example, whether and to what extent marine mammals, such as cetaceans, are in the same area in which marine vessels are or will be traveling—not only to protect the cetaceans but also the vessels. It is important also for operators of fishing boats to know whether certain fish were and possibly remain in a certain area. Businesses that operate eco-tours—that is, tours that often feature viewing animals that live in a particular area—seek to take their customers to areas on land or on the water in which they are more likely to view the animals.

Certain of these commercial interests seek to obtain and use information regarding a certain subject contemporaneously as the information and data is collected. Aerial surveys, for example, can provide contemporaneous information regarding subjects. Such surveys are used to determine, for example, animal presence, distribution, movement, use of habitat, and density. A variety of disadvantages are associated with such surveys. For example, aerial surveys are costly, often provide information only during daylight hours, and, unless repeated, cannot provide historical information that can place the contemporary data in a larger context.

Other commercial interests because of their nature must deploy systems that can operate directly in a given environmental context and be able to collect a body of information from which it can be reliably determined the identity of subjects that were present in the area and whether they may be likely remain in the area.

Passive acoustic detection, or passive acoustic monitoring (collectively "PAM") systems use sensors that are deployable in marine and terrestrial contexts to collect sound information and one or more recorders to record the sound information thereby permitting a body of sound data to be amassed. Because animals often produce sounds by which each animal can be identified, PAM systems can help determine what animals are present in the given marine or terrestrial ecosystem. Systems that can detect sounds of biological origin can detect also any sound including those generated by vehicles, ships, and other subjects and produced because of natural phenomena. Such systems that use sounds from animals, vehicles, and other sources of anthropogenic sounds and noise for identification purposes are considered to be a useful cost-efficient complement or alternative to aerial surveys. PAM systems can more easily provide information regarding animal distribution, habitat use, and relative density.

Advantageously, PAM systems can be used to collect and record a large amount of data. A wide variety of commercial interests seek access to and the use of this data. For example, currently government agencies, oil and gas companies, environmental companies, and non-profit groups seek to obtain access to and use the large bodies of acoustical data recordings obtained using terrestrial or underwater arrays of sensors in order to extract the information that they need.

Many techniques exist that are intended to help with the organization and analysis of large bodies of acoustic data in order that select certain information can be extracted from the data. Data analysis includes, but not limited to, the detection of sounds from only one or more certain subjects—the "signals of interest" or "SOI" in this application. Data analysis can include also the evaluation of the distribution of the SOI over time, whether one or more of the features of the SOI change over time, and whether and to what extent ambient noise exists in the area in which the SOI is found and the possible source of the ambient noise.

A reliable and accurate way of extracting useful information from the data collected through the passive acoustic monitoring of marine and terrestrial ecosystems is through the visual analysis of the digital acoustical recordings. A number of commercial products have been offered to allow the visual analysis of digital acoustical data. However, the data visualization and extraction techniques implemented in the existing commercial products often enable only a small portion of long-term data recordings—in some cases ten percent or less—to be processed with an acceptable accuracy and quality, given typical budgetary and times constraints. Some of existing products for the visual analysis of the recorded acoustic data and detection of SOI permit a user to view a sound spectrogram and a time series. In some cases, the offered spectrogram does provide enough information to permit a viewer to determine whether a SOI is present in a given selection of data taken from a larger body of data. However, spectrograms developed through the use of conventional data analysis systems take large portions of the typical screen used for the display of the spectrograms. As a result, the amount of data that can be offered to a viewer at any one time is limited. A viewer seeking to analyze and view as spectrograms a large amount of data—such as the entire body of data recorded over a particular time or for a particular event—must be prepared to devote an equally large amount of time given that the display must be changed to show all related spectrograms. The amount of time needed to analyze an entire data set through conventional methods linearly increases as the amount of time that was spent to collect the data. It is difficult also for a user to readily determine whether any pattern exists in the recorded data given that all the data is typically not shown on a single screen.

Therefore there is a need for a system and methods by which large bodies of acoustic data can be analyzed and, for example, one or more signals of interest identified quickly and reliably. The present invention satisfies this demand.

SUMMARY OF THE INVENTION

The present invention is directed to acoustics and signal processing. More specifically, the present invention is directed to a system and methods by which whether and the time during which one or more subjects are present within a given area of a marine or terrestrial ecosystem, and other information regarding the subjects can be efficiently determined by the sounds that the subjects produce. Advantageously, certain embodiments of the present invention permit a user to more rapidly analyze a large body of acoustic data recorded from the passive acoustic monitoring of an area and, through one or more visual presentations of the sounds, obtain additional information about the signals of interest.

Certain embodiments of the present invention permit a user to define a signal of interest by the features of the signal such that the system can automatically produce a visual presentation of the data that is immediately accessible to the user. In a certain embodiment, the user may configure the system to select for signals of a certain range or classification such that the data is presented graphically in a two-dimensional histogram—in which the "y" axis is frequency or other selected signal feature and the "x" axis is time and in which the data is compressed such that a greater amount of time over which the data was received can be efficiently shown to the user. Through such a depiction, the user can readily see the period of time over which the sounds were received, the minimum frequency, the maximum frequency and other features of all detected sounds. The user can then select a certain area of feature shown on the histogram and the system will automatically produce one or more spectrograms in which all the detected signals that are within the selected area of feature are depicted.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings, where like designations denote like elements, and in which.

DETAILED DESCRIPTION

Figure 1:
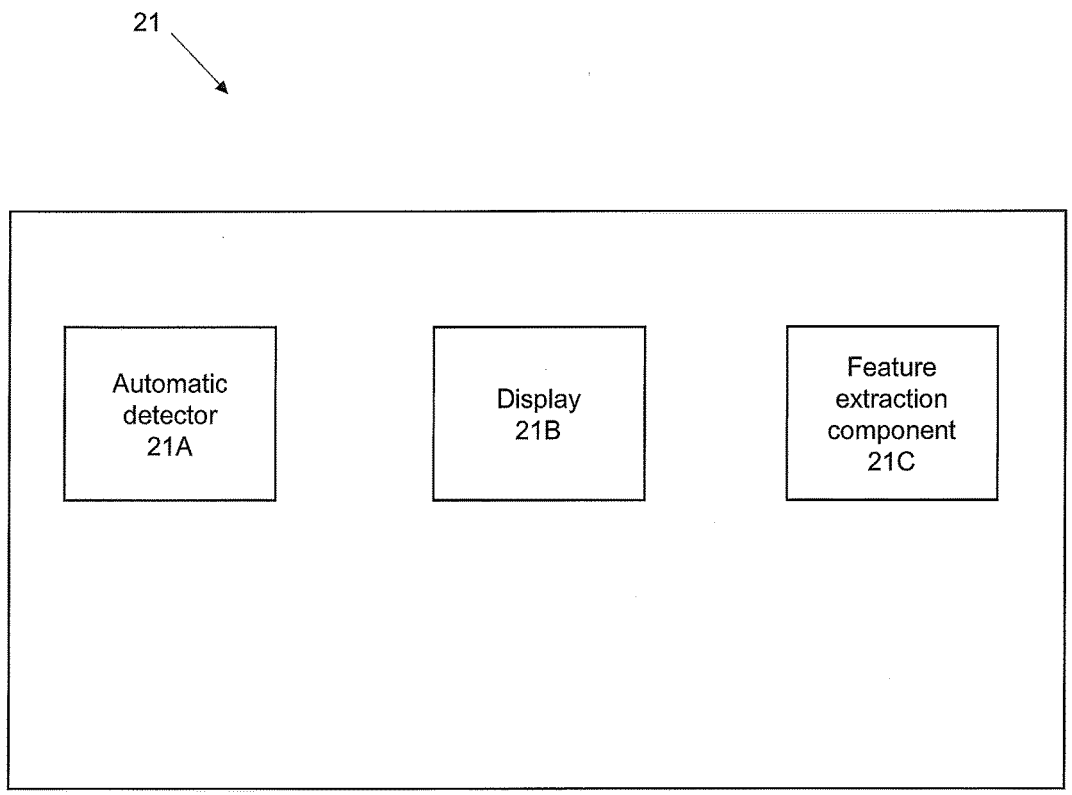
FIG. 1 is a schematic drawing of one embodiment of a system according to the present invention.

Certain preferred embodiments of a system—for facilitating the rapid analysis of a large body of acoustic data recorded from the passive acoustic monitoring of an area and, through one or more visual presentations of the sounds, obtain additional information about one or more the signals of interest—is identified in the Drawings by the number 21. Although a number of embodiments of the present invention will be described in the following, it is understood that these embodiments are presented by way of example only, not limitation. Accordingly, the detailed description of the exemplary embodiments of the invention should not be construed to limit the scope or breadth of the invention.

One preferred embodiment of the system 21 of the present invention is shown in FIG. 1. The illustrated embodiment of the system 21 illustrated in FIG. 1 includes an automatic detector 21A, a display 21B, and a feature extraction component 21C.

Figure 2:
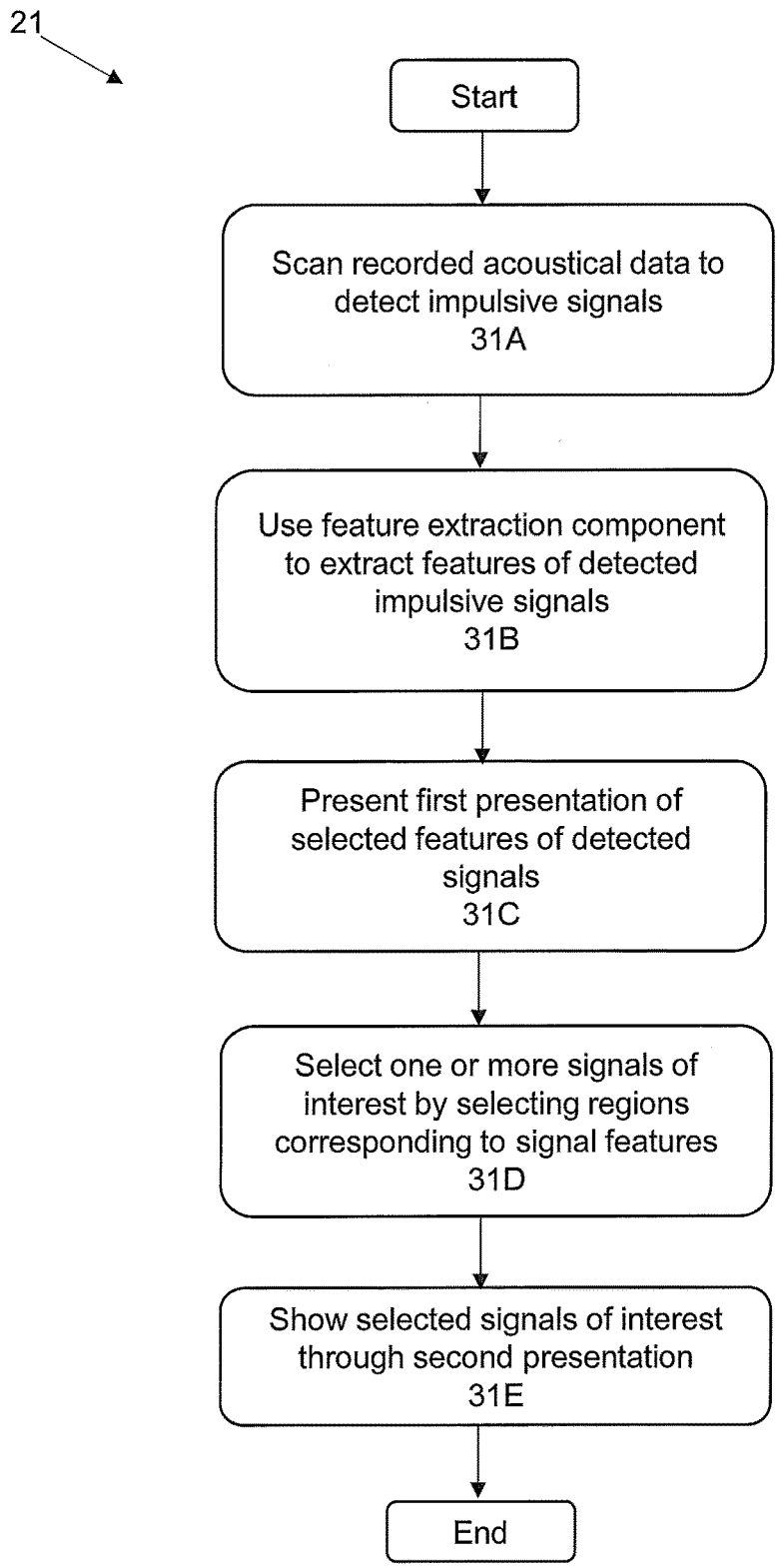
FIG. 2 is a flow chart showing the operation of one preferred embodiment of the present invention.

The operation of one embodiment of the system 21 by which the recorded acoustical data may be analyzed and presented such that the signals of interest may be efficiently selected and visually is illustrated in FIG. 2 and includes steps identified as 31A through 31E.

Figure 5:
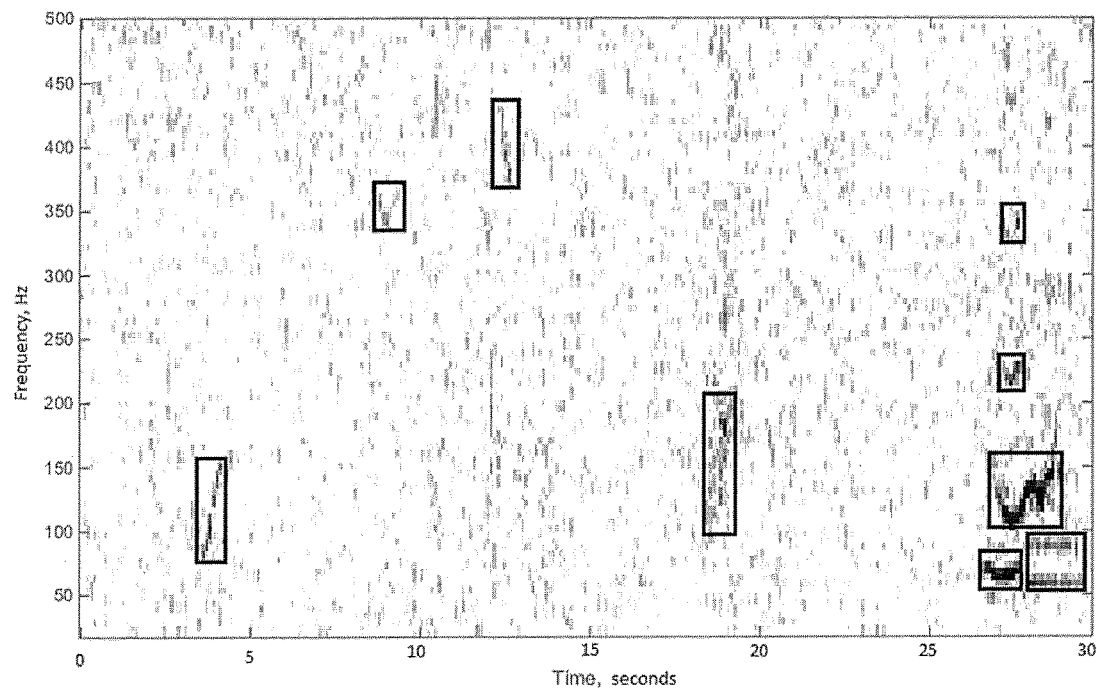
FIG. 5 is a presentation prepared through the use of one preferred embodiment of the present invention.

Step 31A is a detection step that processes digital acoustical data collected through the use of a PAM system operating in a given area of a terrestrial or underwater ecosystem. The system 21 includes an automatic detector 21A by which the digital acoustical data recordings may be automatically scanned and impulsive signals occupying pre-selected frequency band detected from any continuous ambient noise. The data transformed through this step 31A may be shown as a presentation on the display component 21B of the system 21. One embodiment of an automatic detector 21A that may be developed through the use of the system includes an energy-based detector which detects impulsive signals as areas on a data spectrogram which exceed certain threshold within a pre-specified frequency band. Signal-specific detectors implemented as the bank of matched filters can be used also when the frequency band and the type of frequency modulation of SOI are known. FIG. 5 illustrates one example of a spectrogram of acoustical recording—transformed into a 2D gray scale image of sound intensities distributed over the frequencies (the "y" axis) and time in seconds (the "x" axis) and presented on display 21B of the system 21. The automatically detected impulsive signals are marked by rectangles.

Step 31B is a feature extraction step. For purposes of this application, a "feature" is any state, variable, aspect, quantity, or quality that can be measured or characterized in order to better define a signal. Examples of features include but are not limited to time of arrival ("TOA"), duration, minimum frequency, peak frequency, and signal-to-noise ratio (SNR). In step 31B, the feature extraction component 33 of one embodiment of the system 21 is used to automatically measure corresponding features of the detected impulsive signals produced through the operation of step 31A. One embodiment of the feature extraction component 21C can measure one or more features of the detected signals, such as TOA, duration, minimum frequency, peak frequency, SNR and others. For this component, let $f_n(t_k)$, n=1 ... N, k=1 ... K, be the n-th feature of an impulsive signal detected at time $t_k$. Consider N as the total number of features associated with the signal and x as the number of detected signals. Then the feature extraction component can provide K N-dimensional feature vectors, or a total of the NK measurements $f_n(t_k)$. To measure the n-th feature, the algorithm selected by the user can be used.

Step 31C is a signal visualization step. In step 37, all detected signals are visualized using the features extracted in step 31C and representing detected signals by showing the information as a first presentation on display 21B. To produce a two dimensional presentation appropriate for the selected information, the features can be selected by a human operator. One example of such a presentation is a 2D histogram.

Figure 3:
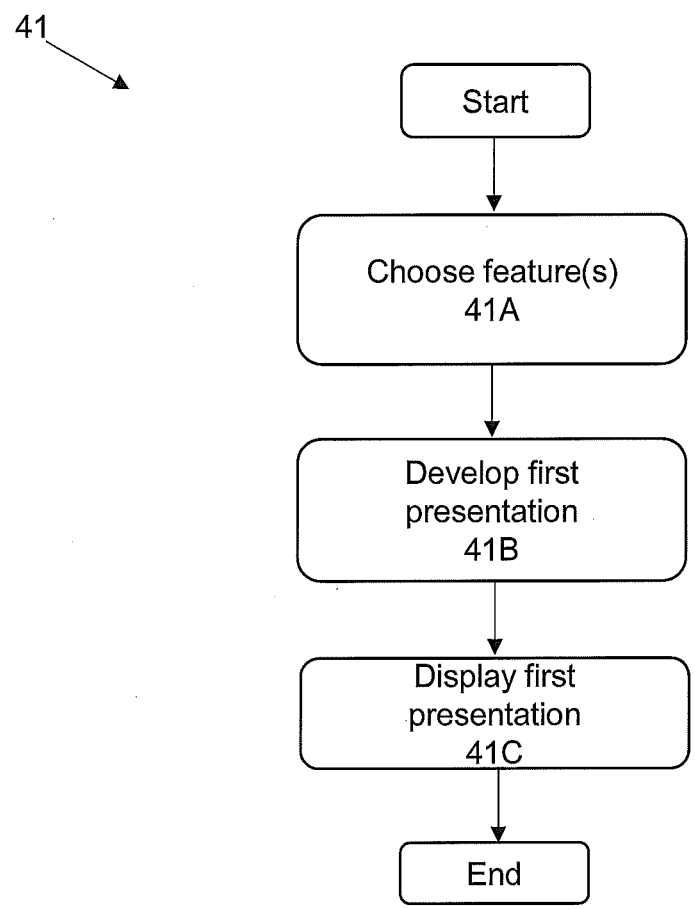
FIG. 3 is a flow chart of a method according to one preferred embodiment of the present invention.
Figure 6:
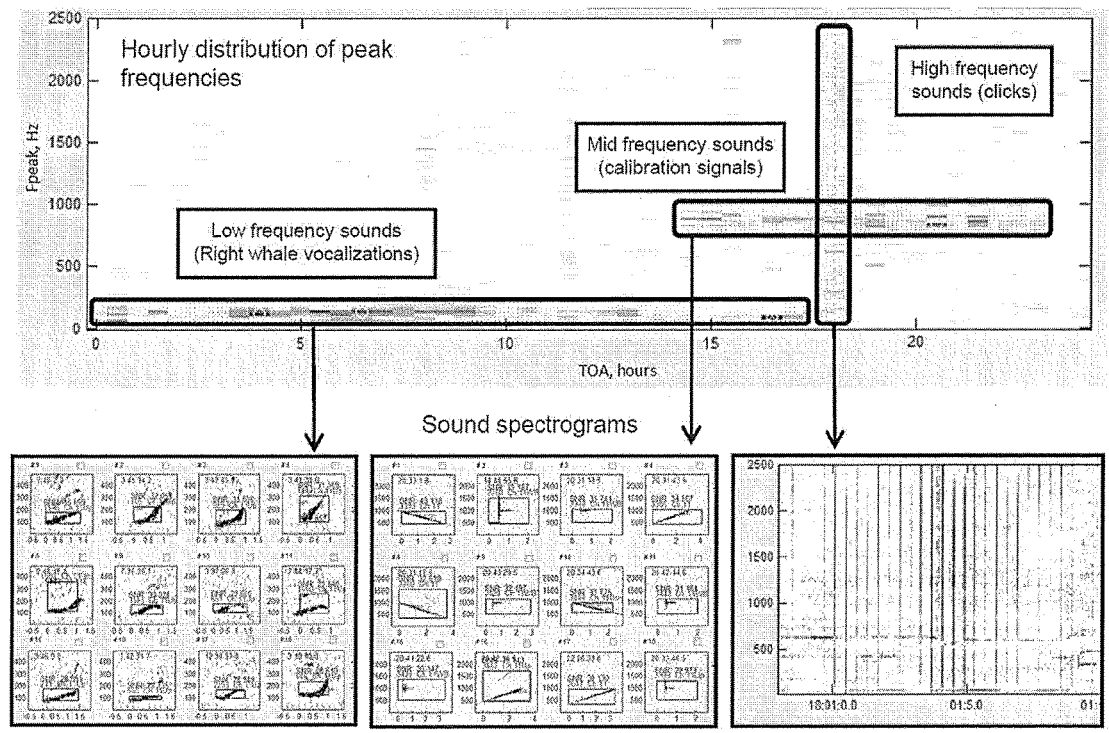
FIG. 6 is a presentation prepared through the use of one preferred embodiment of the present invention.
Figure 7:
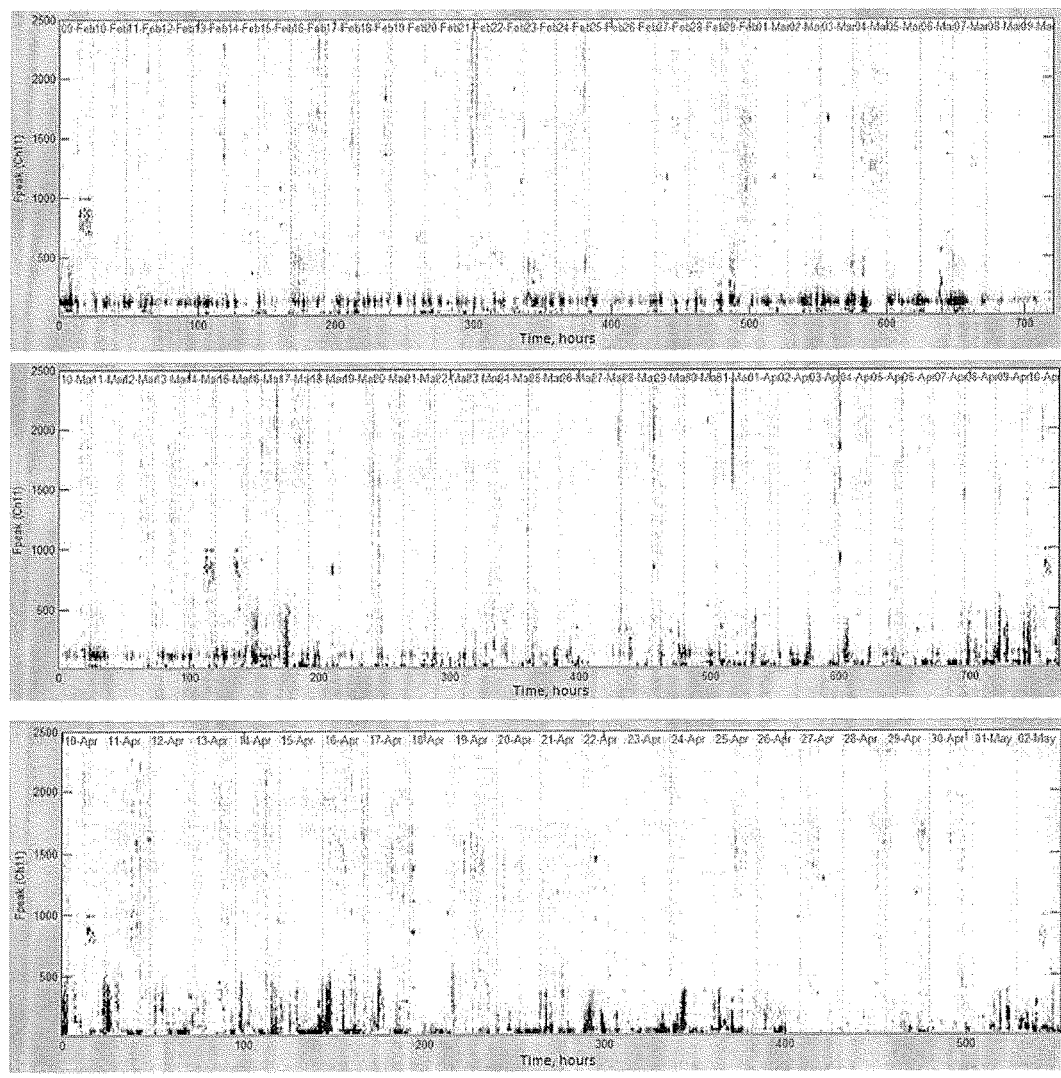
FIG. 7 is a presentation prepared through the use of one preferred embodiment of the present invention.

One embodiment of a visualization method 41 by which the detected impulsive signals may be visualized as a first presentation is shown in FIG. 3 and includes the following steps. In step 41A, a feature, $f_n$, to be displayed is chosen. In step 41B, the first presentation is developed. If the presentation is a 2D histogram, it may be defined as $H(g_n,T)$, where $g_n \in \{g_{n1}<g_{n2}< \ldots <g_{nI}\}$ is a grid of equally or non-equally spaced values of the n-th feature, $T \in \{T_1<T_2< \ldots <T_j\}$ is the time grid, and $H(g_{ni},T_j)$ is the number of signals whose n-th feature falls within the interval $[g_{ni},g_{ni+1}[$ and time of arrival falls within the interval $[T_j,T_{j+1}[$. In step 41C, the first presentation is displayed. One example of such a first presentation is a 2D histogram representing hourly distribution of peak frequencies of all impulsive signals recorded and detected over a 24 hour period of time. An example of such a histogram is shown in FIG. 6. The spectrograms of the impulsive signals whose peak frequencies occupy selected areas on the 2D histogram are also shown in the bottom panel of FIG. 6. FIG. 7 illustrates another representative first presentation as 2D histograms of peak frequencies of all signals detected over 3 month of data recordings.

Figure 9:
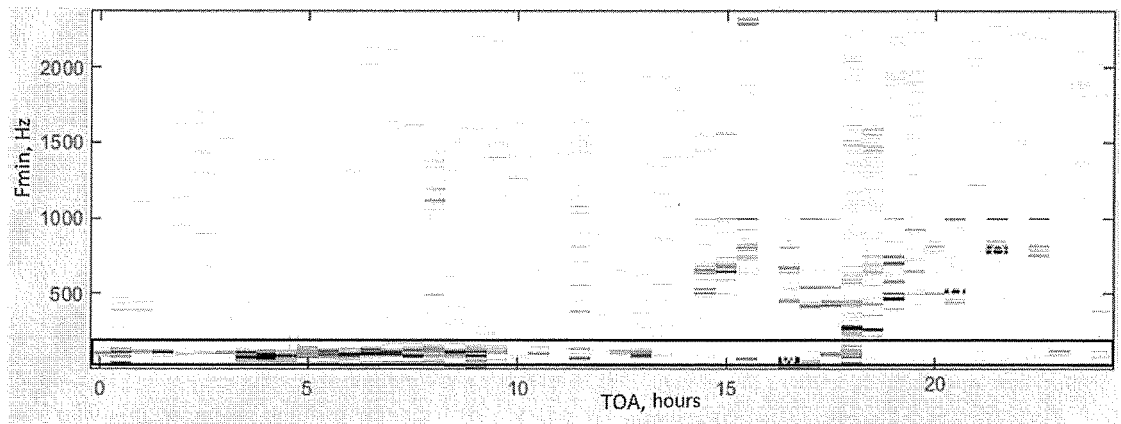
FIG. 9 is a presentation prepared through the use of one preferred embodiment of the present invention.

Another embodiment of a visualization method 41 by which the detected impulsive signals may be visualized as a first presentation includes the following steps. In step 41A, 2 features, $f_n,f_k$ to be displayed are chosen. In step 41B, the first presentation—for example, a 2D histogram $H(g_n,g_k)$,—is developed where, with respect to the example of a 2D histogram, $g_n \in \{g_{n1}<g_{n2}< \ldots <g_{nI}\}$ is a grid of equally or non-equally spaced values of the n-th feature. In step 41C, the first presentation is displayed. An example of a 2D histogram representing the 2D distribution of peak frequencies and durations of all impulsive signals detected during 24 hours of data recordings is shown in FIG. 6. The 2D histogram of minimum frequencies and TOAs of all impulsive signals detected over 24 hours of data recordings are shown in FIG. 9.

Step 31D is a signal selection step. Certain embodiments of the system 21 are configurable such that, through step 31D, a human operator is permitted to select all signals of interest by selecting the regions corresponding to signal features on the first presentation produced through the operation of step 31C 2D histograms. The selected signals can be shown in an appropriate second presentation.

Step 31E is a second presentation step. In step 31E, the second presentation developed through the operation of step 31D may be presented on display 21B. One such second presentation of selected signals may be a 2D spectrogram.

Figure 4:
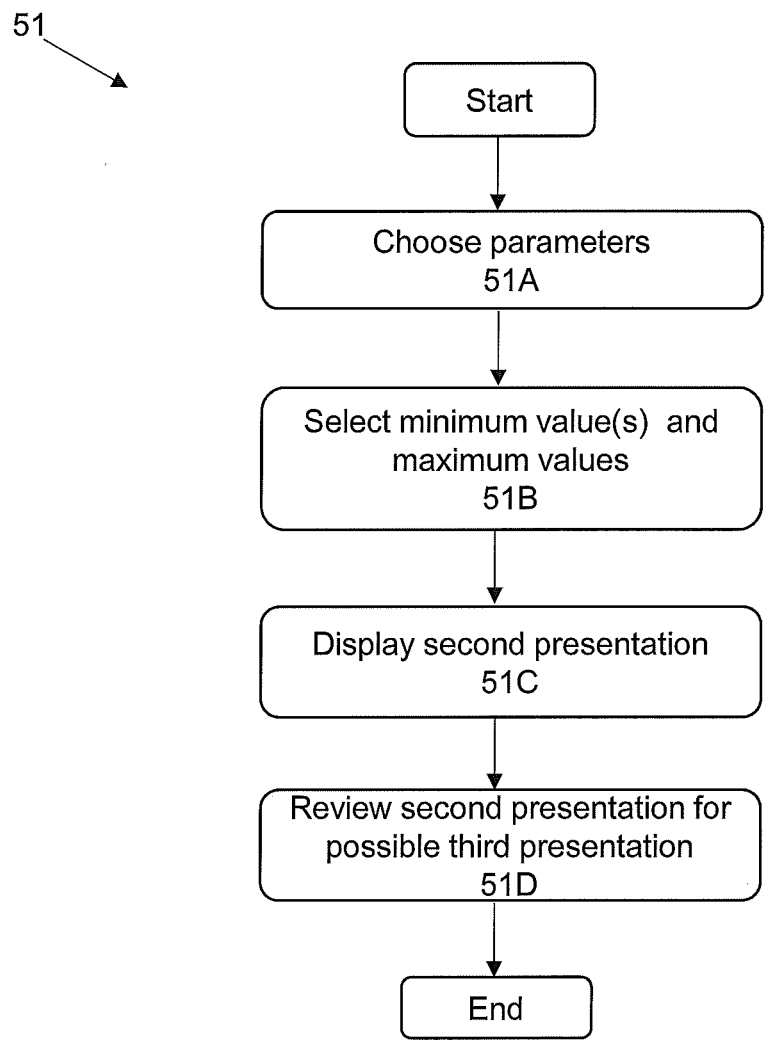
FIG. 4 is a flow chart of a method according to one preferred embodiment of the present invention.
Figure 8:
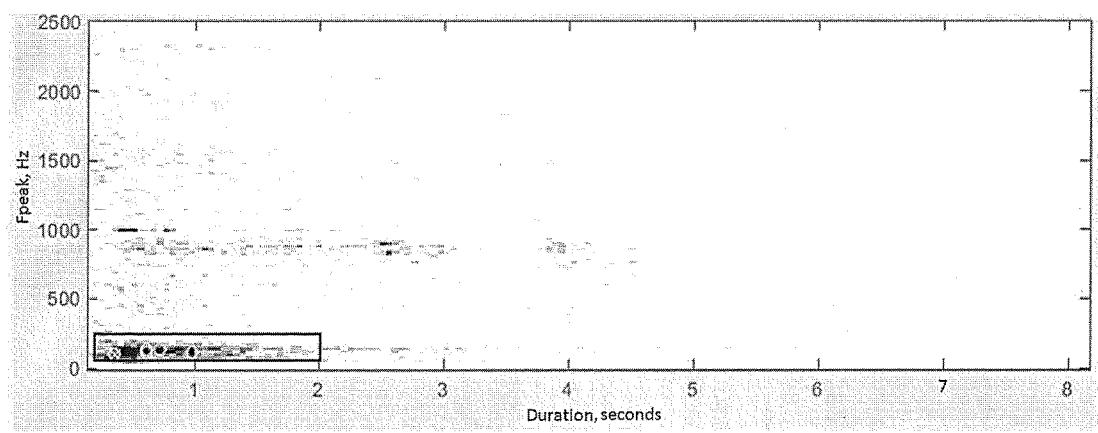
FIG. 8 is a presentation prepared through the use of one preferred embodiment of the present invention.
Figure 10:
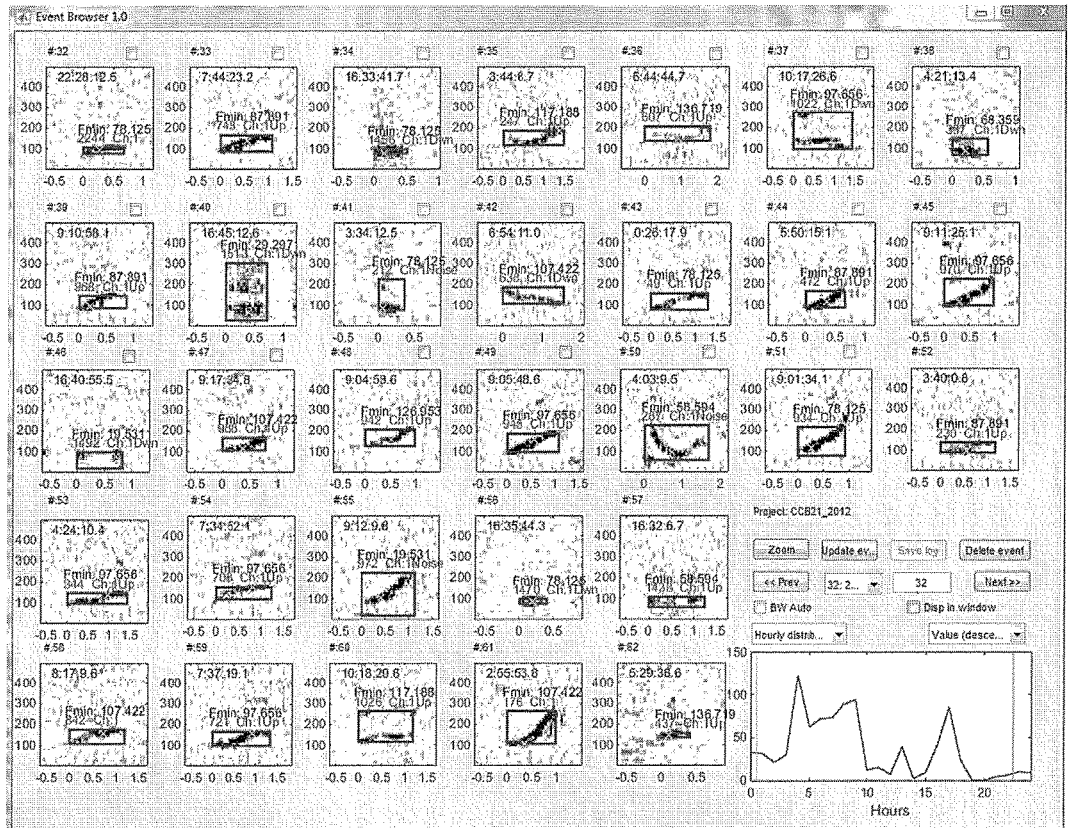
FIG. 10 is a presentation prepared through the use of one preferred embodiment of the present invention.

One preferred embodiment by which signals of interest may be selected in step 31D comprises the signal selection method 51 including the steps shown in FIG. 4. In step 51A: the features (such as minimum frequency, peak frequency, duration, SNR etc.) representing the signals of interest are chosen. In step 51B, for each feature, $f_n$, the minimum and maximum values are selectable. Examples of regions selected in the Fpeak-Duration plane, and in Fmin-TOA plane are shown in FIG. 8 and FIG. 9, in which Fpeak is the peak frequency and Fmin is the minimum frequency of the signal, respectively. In step 51C, the second presentation produced through step 51C is shown. Such a second presentation may be one or more spectrograms of all signals whose characteristics fall within the multidimensional feature space specified in the step 51B. FIG. 10 provides an example of a second presentation—the spectrograms of the 32 signals that are encompassed within the selected feature range. In step 51D, the second presentation is reviewable, for example, by a human operator and any unwanted signals removed in order to possibly produce a third display.

Figure 11:
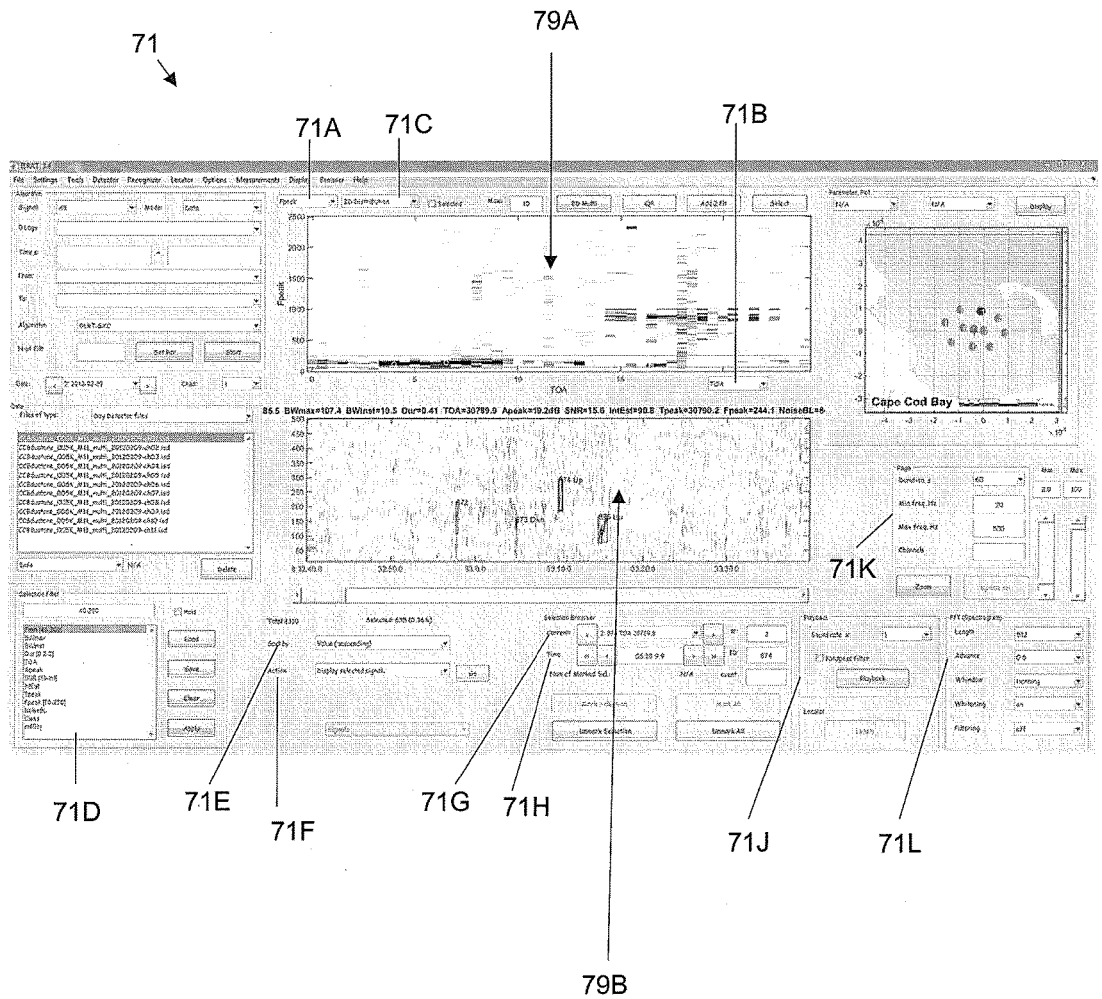
FIG. 11 is a user interface according to one preferred embodiment of the present invention.

The system 21 and methods for processing and the visualization of bioacoustical information are implemented in a computer program through the use of which an interface 71 is produced. The interface 71 facilitates the selection of the data to be presented visually. One embodiment of the present invention produces an interface 71 shown in FIG. 11. A simplified embodiment of the interface 71 includes two components by which visualization of the data through one or more presentations may be controlled to provide the following: signal features visualization component 79A; and, data spectrogram visualization component 79B. An embodiment of component 79A may include the components 71A, 71B, 71C, and 71D described in the following. An embodiment of component 79B may include the components 71E, 71F, 71G, 71H, 71J, 71K, and 71L described in the following. Using this interface 71, the user can select whether and when to scan the digital acoustical recordings using the automatic detector, step 31A, and operate the automatic feature extraction algorithm, step 31B. Step 31C (signal visualization) can be implemented by, for example, selecting the first feature selection component 71A and the second feature selection component 71B to be displayed. Any combination of the following features of the detected signals can be selected for visualization: time of arrival, minimum frequency, peak frequency, duration, maximum bandwidth, instantaneous bandwidth, intensity, SNR, signal class. The visualization mode component shown by 71C allows the mode of visualization of signal features to be selected. The following modes can be selected: i) 2D distribution (default); ii) 2D plot; iii) 1D distribution; and iv) 1D plot. Modes i) and ii) are applicable for two selected features and modes iii) and iv) are applicable for one selected feature, respectively. Selection filter component 71D allows the regions corresponding to features of SOI to be selected. Sort by component 71E allows the order of sorting and displaying the selected signals to be specified. By using the action component 71F, the user can select one of the pre-specified actions. The default action is "display selected signals". If this option is selected and the button "Go" is pressed, the spectrograms of 32 selected signals are displayed as shown in FIG. 10. The signals can be sorted by the value of the feature specified in the feature selection component 71A (in ascending and descending order) and by time (in ascending and descending order). Signal identity component 71G specifies the number of the signal whose spectrogram is displayed in the data spectrogram visualization component 79B, and start time component 71H specifies the start time of the data chunk for computing and visualization of the spectrogram. Playback component 71J is used for setting the sound rate and the bandpath filter presets used for playing back the chunk of data selected in components 71G and 71H. Page component 71K specifies the following presets of the spectrogram visualization: duration of the chunk of data used to compute the spectrogram; minimum frequency and maximum frequency of the spectrogram. Spectrogram component 71L specifies the presets used to compute the spectrogram: FFT length, FFT advance, type of window (rectangular, Bartlett, Hanning etc.), whitening (on or off), and filtering (off, Gaussian, FIR, Median).

Figure 12A:
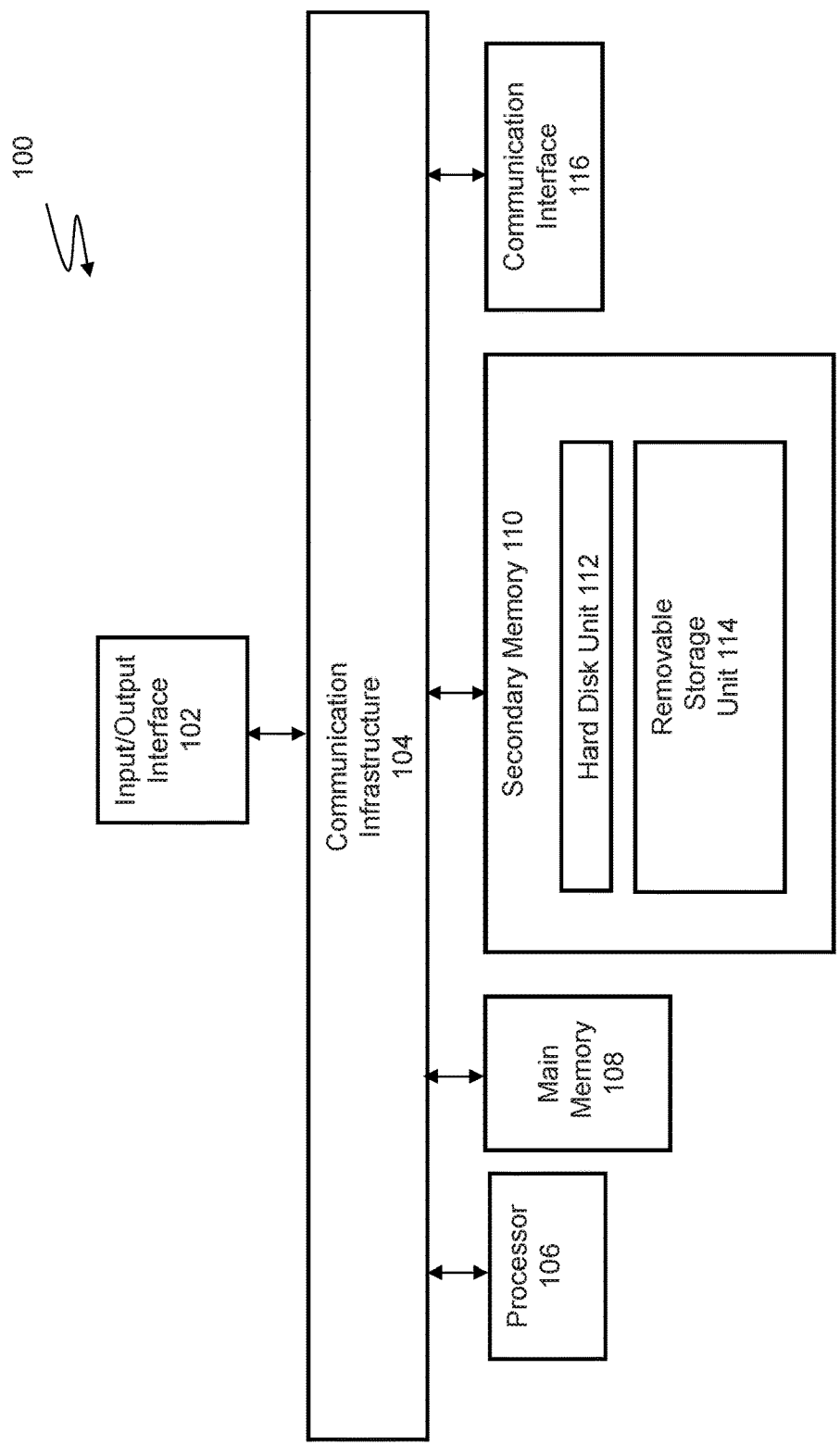
FIG. 12A is a schematic view of a computing system according to one preferred embodiment of the present invention.

FIG. 12A illustrates an exemplary computer system 101 that may be used to implement the methods according to the invention. Computer system 101 includes an input/output interface 102 connected to communication infrastructure 104—such as a bus—, which forwards data such as graphics, text, and information, from the communication infrastructure 104 or from a frame buffer (not shown) to other components of the computer system 101. The input/output interface 102 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 101 includes one or more processors 106, which may be a special purpose or a general-purpose digital signal processor configured to process certain information. Computer system 101 also includes a main memory 108, for example random access memory (RAM), read-only memory (ROM), mass storage device, or any combination thereof. Computer system 101 may also include a secondary memory 110 such as a hard disk unit 112, a removable storage unit 114, or any combination thereof. Computer system 101 may also include a communication interface 116, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 108, secondary memory 110, communication interface 116, or a combination thereof, function as a computer usable storage medium, otherwise referred to as a computer readable storage medium, to store and/or access computer software including computer instructions. For example, computer programs or other instructions may be loaded into the computer system 101 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 114 or hard disc unit 112 to the secondary memory 110 or through the communication infrastructure 104 to the main memory 108 of the computer system 101.

Communication interface 116 allows software, instructions and data to be transferred between the computer system 100 and external devices or external networks. Software, instructions, and/or data transferred by the communication interface 116 are typically in the form of signals that may be electronic, electromagnetic, optical or other signals capable of being sent and received by the communication interface 116. Signals may be sent and received using wire or cable, fiber optics, a phone line, a cellular phone link, a Radio Frequency (RF) link, wireless link, or other communication channels.

Computer programs, when executed, enable the computer system 101, particularly the processor 106, to implement the methods of the invention according to computer software including instructions.

The computer system 101 described may perform any one of, or any combination of, the steps of any of the methods according to the invention. It is also contemplated that the methods according to the invention may be performed automatically.

The computer system 100 of FIG. 12A is provided only for purposes of illustration, such that the invention is not limited to this specific embodiment. It is appreciated that a person skilled in the relevant art knows how to program and implement the invention using any computer system.

The computer system 101 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or iPhone®.

Figure 12B:
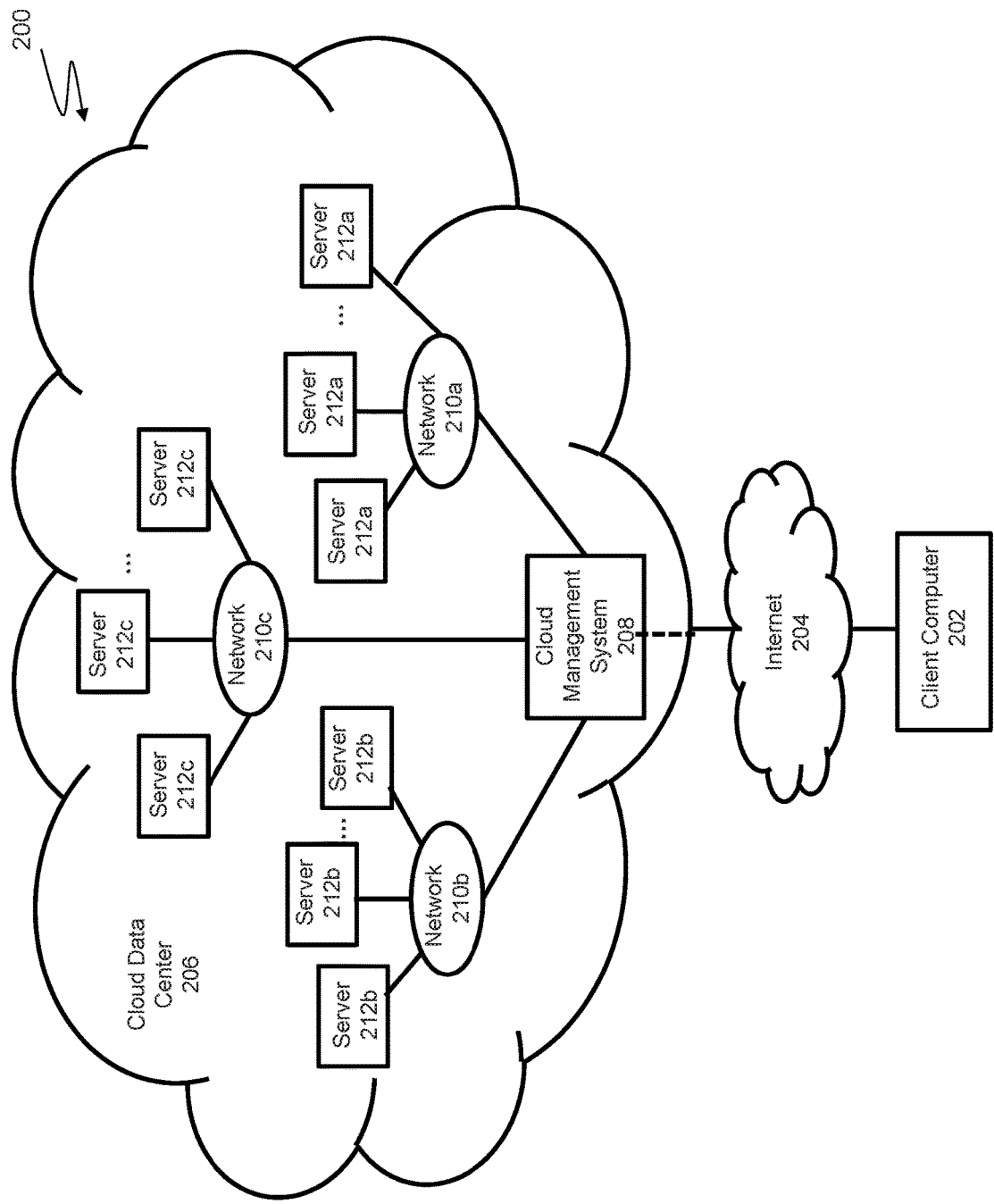
FIG. 12B is a schematic view of an exemplary cloud computing system according to one preferred embodiment of the present invention.

FIG. 12B illustrates an exemplary cloud computing system 201 that may be used to implement the methods according to the present invention. The cloud computing system 201 includes a plurality of interconnected computing environments. The cloud computing system 201 utilizes the resources from various networks as a collective virtual computer, where the services and applications can run independently from a particular computer or server configuration making hardware less important.

Specifically, the cloud computing system 201 includes at least one client computer 202. The client computer 202 may be any device through the use of which a distributed computing environment may be accessed to perform the methods disclosed herein, for example, a traditional computer, portable computer, mobile phone, personal digital assistant, tablet to name a few. The client computer #02 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 202 also includes a communications interface, for example, a modem, a network interface (such as an Ethernet card), a communications port, a PCMCIA slot and card, wired or wireless systems, etc. The communications interface allows communication through transferred signals between the client computer 202 and external devices including networks such as the Internet 204 and cloud data center 206. Communication may be implemented using wireless or wired capability such as cable, fiber optics, a phone line, a cellular phone link, radio waves or other communication channels.

The client computer 202 establishes communication with the Internet 204—specifically to one or more servers—to, in turn, establish communication with one or more cloud data centers 206. A cloud data center 206 includes one or more networks 210a, 210b, 210c managed through a cloud management system 208. Each network 210a, 210b, 210c includes resource servers 212a, 212b, 212c, respectively. Servers 212a, 212b, 212c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 208 can comprise a dedicated or centralized server and/or other software, hardware, and network tools to communicate with one or more networks 210a, 210b, 210c, such as the Internet or other public or private network, with all sets of resource servers 212a, 212b, 212c. The cloud management system 208 may be configured to query and identify the computing resources and components managed by the set of resource servers 212a, 212b, 212c needed and available for use in the cloud data center 206. Specifically, the cloud management system 208 may be configured to identify the hardware resources and components such as type and amount of processing power, type and amount of memory, type and amount of storage, type and amount of network bandwidth and the like, of the set of resource servers 212a, 212b, 212c needed and available for use in the cloud data center 206. Likewise, the cloud management system 208 can be configured to identify the software resources and components, such as type of Operating System (OS), application programs, and the like, of the set of resource servers 212a, 212b, 212c needed and available for use in the cloud data center 206.

The present invention is also directed to computer products, otherwise referred to as computer program products, to provide software to the cloud computing system 201. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 201 of FIG. 12A is provided only for purposes of illustration and does not limit the invention to this specific embodiment. It is appreciated that a person skilled in the relevant art knows how to program and implement the invention using any computer system or network architecture.

The invention claimed is:

1. A method for visually presenting acoustical information comprising the steps of:
   scanning digital acoustical data recordings from one or more subjects in an environment;
   detecting from the digital acoustical data recordings signals within pre-selected frequency bands;
   computing a histogram of feature values of the detected signals;
   presenting on a display a first presentation comprising the histogram;
   choosing feature values of the detected signals by choosing regions on the histogram;
   automatically selecting signals based on the choosing step; and
   illustrating on the display a second presentation comprising the automatically selected signals, wherein the first presentation and the second presentation are shown on the display simultaneously.

2. The method according to claim 1, wherein the feature values are selected from the group consisting of: time of arrival ("TOA"), duration, minimum frequency, peak frequency, signal-to-noise ratio (SNR), maximum bandwidth, instantaneous bandwidth, intensity, signal class.

3. The method according to claim 1, wherein the histogram is a one-dimensional histogram.

4. The method according to claim 1, wherein the histogram is a two-dimensional histogram.

5. The method according to claim 1, wherein the histogram comprises a y-axis directed to sound intensities distributed over frequencies and an x-axis directed to time in seconds.

6. The method according to claim 1, wherein the computing step includes the step of extracting features using a function $f_n(t_k)$, n=1 ... N, k=1 ... K representing a n-th feature value of each detected signal at time $t_k$, wherein N is a total number of feature values associated with each detected signal and K is a number of detected signals.

7. The method according to claim 1, wherein the presenting step further comprises the steps of:
   representing the feature value as $f_n$; and
   defining the histogram as $H(g_n,T)$, where $g_n \in \{g_{n1} < g_{n2} < \ldots < g_{nI}\}$ is a grid of equally or non-equally spaced values of a n-th feature value, $T \in \{T_1 < T_2 < \ldots < T_J\}$ is a time grid, and $H(g_{ni}, T_j)$ is a number of signals whose n-th feature value falls within an interval $[g_{ni}, g_{ni+1}[$ and a time of arrival falls within an interval $[T_j, T_{j+1}[$.

8. The method according to claim 1, wherein the presenting step further comprises the steps of:
   representing the feature value as $f_n$, $f_k$; and
   defining the histogram as $H(g_n, g_k)$, where $g_n \in \{g_{n1} < g_{n2} < \ldots < g_{nI}\}$ is a grid of equally or non-equally spaced values of a n-th feature value.

9. The method according to claim 1, wherein the second presentation is a spectrogram.

10. The method according to claim 1, wherein the one or more subjects is an animal.

* * * * *